United States Patent [19]
Tessien

[11] Patent Number: 5,197,455
[45] Date of Patent: Mar. 30, 1993

[54] CHARCOAL STARTER

[75] Inventor: Ross Tessien, Grass Valley, Calif.

[73] Assignee: Steven G. Frost-Ruebling, San Jose, Calif. ; a part interest

[21] Appl. No.: 847,353

[22] Filed: Mar. 6, 1992

[51] Int. Cl.⁵ .............................................. F24B 13/00
[52] U.S. Cl. ................................ 126/25 B; 126/25 R; 126/144; 126/26; 126/152 R
[58] Field of Search ................. 126/25 B, 26, 25 R, 126/144, 152 R

[56] References Cited

U.S. PATENT DOCUMENTS

| | | | |
|---|---|---|---|
| 1,919,407 | 7/1933 | Wood | 126/9 B |
| 3,216,379 | 11/1965 | Durfee | 126/25 B |
| 3,296,984 | 1/1967 | Durfee | 126/25 B |
| 3,307,506 | 3/1967 | Rose | 126/25 B |
| 3,339,505 | 9/1967 | Bean | 126/25 B |
| 4,793,320 | 12/1988 | Bakie | 126/25 B |

*Primary Examiner*—Larry Jones
*Attorney, Agent, or Firm*—Mark C. Jacobs

[57] ABSTRACT

An improved charcoal starter that employs a grate having a conical shaped charcoal briquette receiving and stacking portion, to permit an enhanced rise of heat to impact the coals to get them to burn. The heat may come from paper kindling as conventionally disposed beneath the grate, or from a resistance heater element built into the grate. The grate may resemble a witch's hat with the retaining disk being the brim and a conical portion being disposed thereon, both with suitable apertures therein; or the grate can be made of suitable wire. The grate may be permanently mounted within the starter's cylindrical body or be removable therefrom.

6 Claims, 5 Drawing Sheets

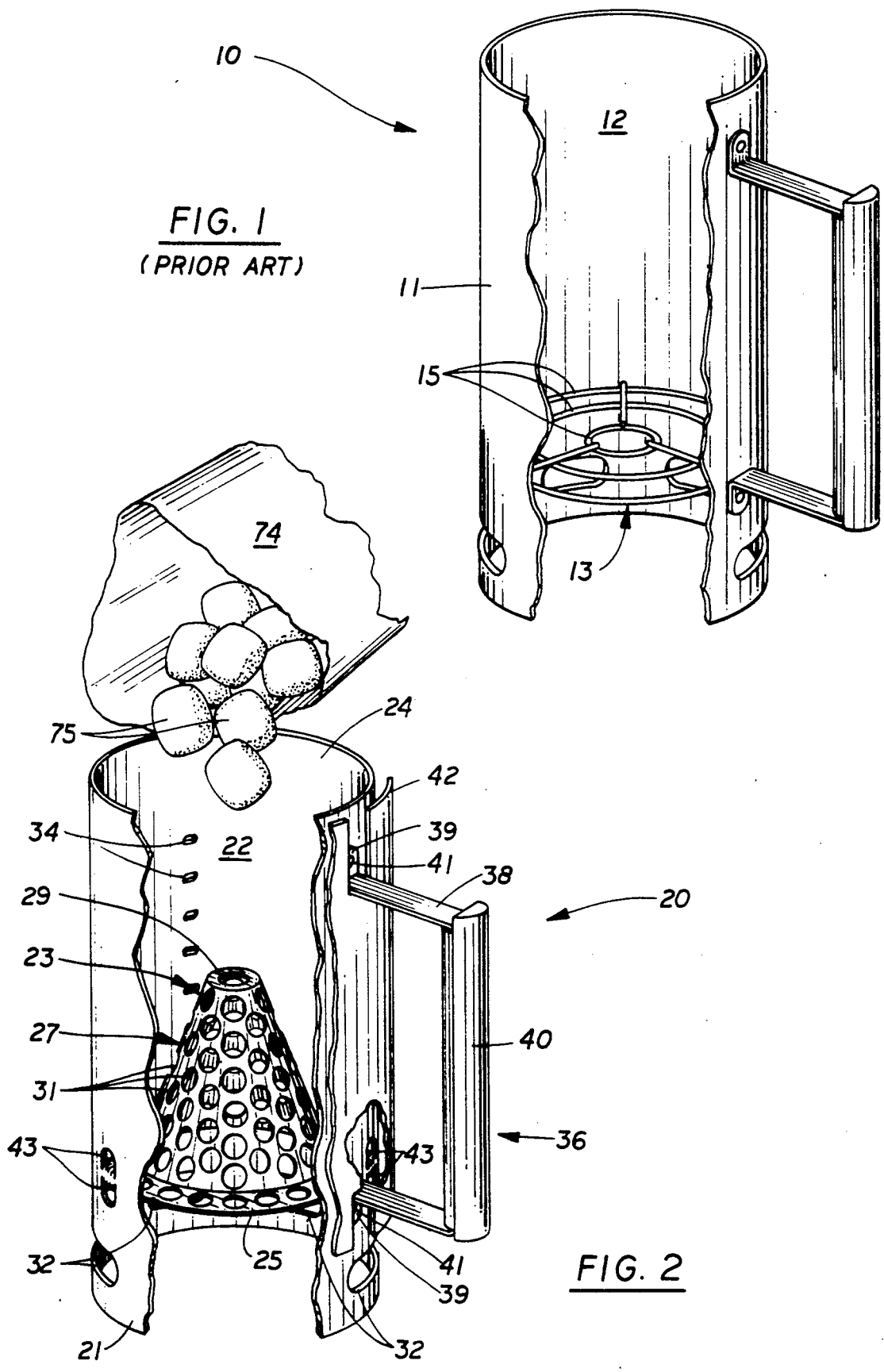

CHARCOAL STARTER

FIELD OF THE INVENTION

This invention pertains to devices for the commencement of the burning of charcoal for use primarily in barbecue cooking devices.

BACKGROUND: DISCUSSION OF PRIOR ART

This apparatus pertains to an improvement in the structure of charcoal starters which, as is known in the art, are used for the commencement of the burning of charcoal prior to the disposition of the charcoal within a barbecue cooking device.

As everyone knows, charcoal briquettes cannot easily be lit merely by holding a match to them. It is necessary to use some other means to induce burning. One such means is to use charcoal lighter fluid, but this is slow, and can leave a petroleum taste in the food later cooked. Additionally, certain municipalities, for example, many in the greater Los Angeles Basin are concerned with air pollution, and have banned the use of normal charcoal starter fluid. Also used are electrical resistance heaters which though slow, leave no bad taste. These units, however, require an electrical outlet, and an electrical cord such as is not always available, for example at a park or a beach.

One other way that has been utilized to commence the burning of charcoal is the use of chimney charcoal starters. One such unit is sold under the brand name of the Christen Charcoal Starter. These units are open on the bottom such that a layer of crumpled up newspaper can be inserted up into the unit below a grate. Charcoal briquettes are laid upon said grate, the paper lit, and as the newspaper burns, the radiating and conductive energy from the flames brings high heat to the charcoal briquettes such that they are able to commence burning. See FIG. 1 as typical of the prior art.

While faster and more economical than starter fluid, these charcoal starters are still relatively slow to bring about the burning of the charcoal. One key reason is that all current art chimney charcoal starters use a flat grate of either welded wire, or perforated sheet metal. The instant version of grate uses a non planar, inverted cavity design which promotes faster heating of the briquettes.

KNOWN PRIOR ART

A tremendous volume of work has been done on fire grates to burn a variety of fuels for use in heaters, furnaces, boilers etc., as evidenced by U.S. Pat. No. 4,522 (Reissue No. 121), Morse and Lewis; U.S. Pat. No. 4,257,391, Carin, and less relevant as well as U.S. Pat. No. 753,298, F. H. E. C. Nehse; U.S. Pat. No. 1,078,071, G. M. S. Tait; U.S. Pat. No. 2,380,630, R. C. Cross; and U.S. Pat. No. 1,541,649, J. D. Martin. These incorporate a cavity design into their respective fuel supporting means, but make no mention of chimney charcoal starters.

Regarding U.S. Pat. No. 4,522, (Reissue o. 121), Morse and Lewis; here, a grate with an inverted cavity is used to support fine particulate fuel such as sawdust. The fuel is lit from above, and the grate aids combustion by distributing air to a greater volume of the fuel since fine particulate fuel has a great resistance to the flow of air. This grate was not designed to employ combustion from below, but rather functions as the air delivery and distribution means provided by the natural cavities created by non particulate fuels such as charcoal briquettes.

In U.S. Pat. No. 4,257,391, Carin, this device is designed to aid combustion of particulate fuel in a furnace so as to preclude the necessity and expense of forming briquettes from saw dust and the like. The grate employed comprises a series of spaced concentric members which form a pyramid. The structure maximizes combustion.

Each of these devices demonstrates a unique grate design aimed at increasing the efficiency of steady state combustion of various fuels within their respective fire boxes, and not the rate at which the combustion is started. This is contrary to the object of the instant invention which is to increase the rate of heating non-particulate fuels such as charcoal briquettes.

Now turning to devices intended for use with charcoal briquettes, many attempts have been made to speed the heating of said briquettes as evidenced in U.S. Pat. No. 4,417,565, Karpinia; U.S. Pat. No. 3,538,905, Reichenbach and Talladira; U.S. Pat. No. 4,896,650, Hait; U.S. Pat. No. 3,499,399, Kaufmann; and U.S. Pat. No. 4,461,270, Sutter. None of these attempts has resulted in a cavity being incorporated into the grate.

Karpinia demonstrates an attempt to decrease the heating time of chimney style charcoal starters using a venturi effect. However the venturi effect will only play a major role during the initial kindling combustion phase, and will largely disappear during the much longer charcoal heating phase.

Hait, and Reichenbach and Talladira, are examples of using the effects of self radiation, and reflective radiation, respectively. In "The Cooking Unit With Improved Fire Grate", patented by Hait, U.S. Pat. No. 4,896,650 the individual briquettes self radiate, and allow for nearly unrestricted convection. Effectively, the briquettes are assembled in such a way as to form a miniature cavity, open at top and bottom, and one briquette high. This does not solve the problem of lighting a substantial quantity of briquettes for later disposition in a barbecue, as does a chimney style charcoal starter.

There is a need therefore for an improved charcoal starter that allows the charcoal to catch fire in significantly less time.

It is an object, therefore, of this invention to provide an improved charcoal starter apparatus.

It is another object of this invention to provide an environmentally safe charcoal starter that operates quicker than the conventional cylindrical starters available in the marketplace.

Yet another object is to provide a charcoal starter having an improved grate for the retention of the charcoal.

It is a further object to provide an improved grate which can be sold separately in order to retrofit existing charcoal starters thereby offering users of other brands of charcoal starters a means to reduce the time required to heat the briquettes.

It is a further object to provide an improved cylindrical charcoal starter apparatus which optionally includes a built-in resistance heater element.

While the description recited herein contains many specifics, such should not be construed as limitations on the scope of the invention, but rather as an exemplification of one preferred embodiment thereof. Many other variations are possible. These and other objects of the invention will in part be obvious and will in part appear hereinafter.

The invention accordingly comprises the product possessing the features, properties, and the relation of components which are exemplified in the following detailed disclosure and the scope of the application of which will be indicated in the claims.

For a fuller understanding of the nature and objects of the invention, reference should be made to the following detailed description taken in conjunction with the accompanying drawings.

BRIEF DESCRIPTION OF THE FIGURES

FIG. 1 is a perspective view partially in cut away of a conventional charcoal starter of the prior art.

FIG. 2 is a perspective view partially in cut away showing the improved cylindrical charcoal starter of this invention in its first embodiment.

SUMMARY OF THE INVENTION

An improved tubular charcoal starter device for use with barbecues which employs an optionally removable grid with an inverted cavity, conical in the preferred embodiment, for the disposition of the briquettes. A second embodiment is featured wherein the grid for the stacking of the briquettes comprises a resistance heater which is used to raise the temperature of the briquettes and which does not require, but allows for, the utilization of burning newspaper as is discussed with respect to the first embodiment of this invention.

DESCRIPTION OF THE PREFERRED EMBODIMENT

Figure 5:
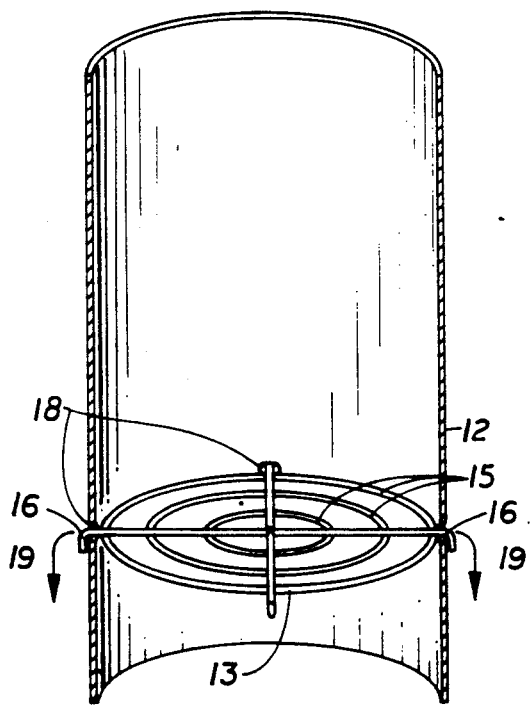
FIG. 5 is a diagrammatic cutaway view illustrating a first mode of attachment of the grid to the cylinder.

FIG. 1 depicts a conventional prior art charcoal starter 10 comprising a tubular cylinder 11 having a grid 13 disposed across the throat or diameter of the charcoal starter. This grid 13, comprises a metallic mesh or apertured flat disk, a flat disk with numerous punched holes, or a series of connected concentric rings 15. Grid 13 in either configuration, may have a plurality of legs 16 emanating therefrom, to be inserted and bent downwardly into place through slots 18 in the cylinder wall per arrow 19 in FIG. 5.

Figure 6:
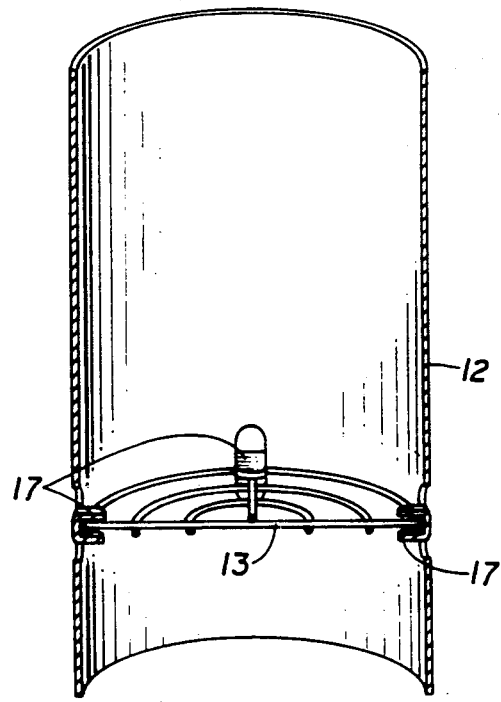
FIG. 6 is a diagrammatic cutaway view illustrating a second mode of attachment of the grid to the cylinder.

Alternatively pairs of tabs 17 such as seen in FIG. 6, can be formed from the cylinder wall 12 and bent inwardly to retain the grid 13 in place. Both of these retention modes are suitable for the instant invention as well.

Turning now to FIG. 2 wherein a charcoal starter according to the instant inventive device 20 is shown. Device 20 comprises a preferably metallic tubular cylindrical charcoal receiver 21 having a cylinder wall 22, having an interior surface and an exterior surface. A charcoal holder or grate 23 is disposed within the cylinder approximately ⅓rd of the way up the elevation, across the opening 24 of the cylinder. Grate 23 optionally includes a first perforated disk portion 25, sized slightly smaller than the diameter of the cylinder 21; and a truncated conical second portion 27 attached to said disk portion along the base of the conical portion but inset from the perimeter of the disk 25. See also FIG. 3. A series of apertures 31 are disposed at various locations on the disk 25 and on the cone. The cone 27 has an opening at the top 29 through which can flow flames and other heated gases from the newspaper used as kindling as will be discussed below.

An optional series of air intake openings 32 are disposed around and through the periphery of the cylinder 21 below the location of the grate 23. These may be oval as shown or any other conveniently fabricated shape. They permit air to reach the newspaper kindling to enhance combustion when used in a barbecue with a pan rather than a grate upon which the charcoal starter is set. Also seen in FIG. 2 are a plurality of briquettes 75 as they would normally be dumped from a bag 74 of same. Grate 23 may be welded into position within the cylinder 21 or retained by the tab pairs method illustrated in FIG. 6, which is a well recognized retention scheme in the metal working art. Such tabs are designated 43 in FIG. 2.

Attached to the cylinder wall 22 is a handle means 36, seen in FIG. 2, which handle means includes a U-shaped handle of metal 38, which handle has an outwardly extending end flange, 39, at each extreme of the U-shaped handle, which flanges are normally disposed relative to their respective leg of the handle. These end flanges may be riveted, welded, or otherwise secured to the outer surface of the cylinder wall 22. U-shaped handle 38 has an insulated handle cover 40 such as of wood or phenolic plastic attached thereto in a conventional manner. Rivets such as 41, may serve double duty to not only secure the handle to the cylinder, but also to form the cylinder 21 itself from the overlying ends of the rolled sheet metal used to form the cylinder.

A series of vertically in-line slots 34 either with or without additional printed indicia give the user an indication of the volume of charcoal loaded into the starter.

An optional heat shield 42 may be mounted in front of the handle cover 40, and spaced from the cylinder itself. The mounting thereof can be achieved in several different ways. One mode of mounting is by the use of tabs from the shield disposed in abutment with the tabs of the handle. Since the use of heat shields is shown in the prior art, further discussion is not necessary.

Figure 4:
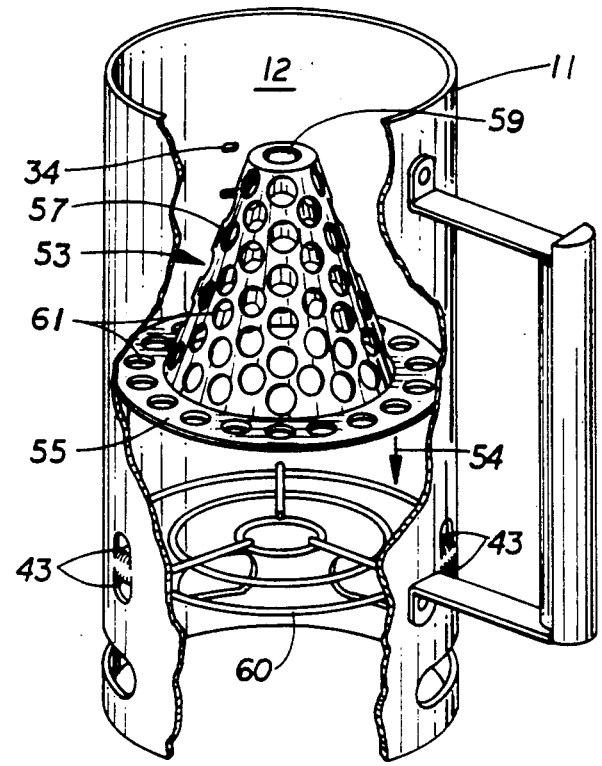
FIG. 4 is a cutaway perspective view of a variant of the apparatus of FIG. 2.

The discussion now moves to FIG. 4, wherein a device somewhat resembling a hybrid between the prior art and the device of FIG. 2 is seen. When like numbers previously referenced are employed, they refer to like parts previously discussed. Here a conventional grid disk 60 is retained in the lower area of the cylinder 11, by tabs 43. In addition to grid 60, a readily removable grate 53, which can move downwardly as per arrow 54 to rest upon grid 60 is employed. This grate 53 also features an optional disk portion 55 having a truncated conical portion 57 mounted thereon. The opening of the truncated cone is designated as 59. A series of randomly spaced apertures 61 are found on both the disk portion and the conical portion of the grate 53. The use of a removable grate allows a user to retrofit an existing charcoal starter with the latest technology. Of course the disk portion would need to be of a diameter to fit within a specific pre-existing conical charcoal starter, and provision could be made to fixedly attach grate 53 to grid 60.

Figure 3:
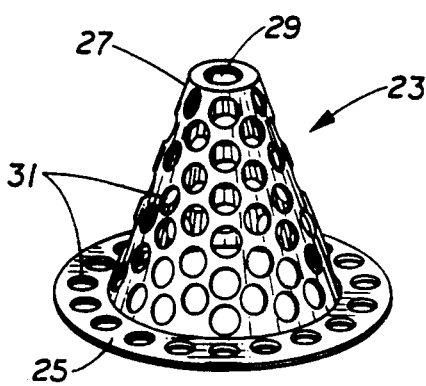
FIG. 3 is an elevational view of the grate portion of the invention of FIG. 2.
Figure 7:
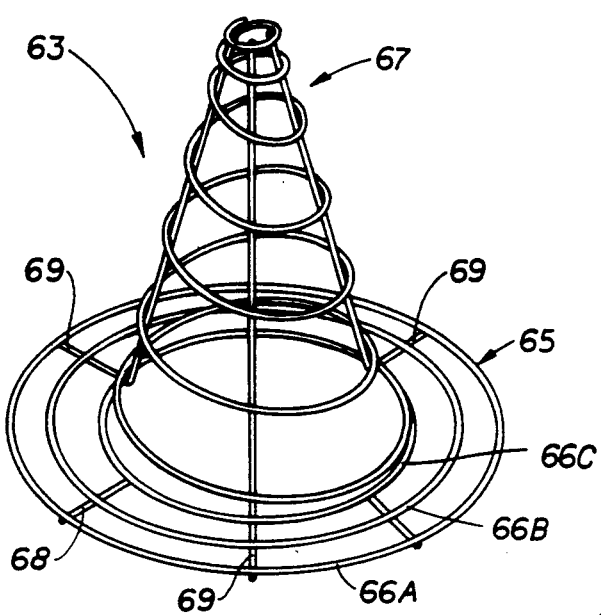
FIG. 7 is an elevational view of an alternate configuration of a grate usable in this invention.

The discussion now turns to FIG. 7, wherein an alternate version of the grate discussed in FIG. 3 is shown. Whereas in FIG. 3, the grate resembled a multi-perforated witch's hat formed of sheet metal, the grate of FIG. 7 is seen to be formed from wire reinforced to form a self-supporting structure.

Here, the grate 63 includes an optional disk portion 65 formed of a plurality of concentric circles of wire 66A, 66B, 66C all of which are welded to connecting members 68 to create a rigid base. Welded in place to this disk 65 is a spiral wire cone 67 which may be reinforced by vertical members. Typical of such vertical members would be a trio of hockey stick shaped reinforcers 69 which are each welded or otherwise secured to various aligned points on the spiral coil and optionally to the base as well. Separate connecting members 68 could be eliminated by welding the rings 66A, B, C to the horizontal short ends of the "hockey stick" angular members. Typical dimensions of a grate 63 would include a diameter of about 6.5 inches for the disk and a diameter of 4.0 inches for the base of the cone and an elevation of about 6 inches. There is of course no criticality to the dimensions, other than the need to fit within a particular charcoal starter's cylinder. The attachment mode of FIG. 6 is equally applicable here. Suitable wire would be about ⅛th inch in diameter.

Such a grate is low in cost, and provides a maximum of airflow for the burning gases emanating from the burning newspaper kindling.

Figure 8:
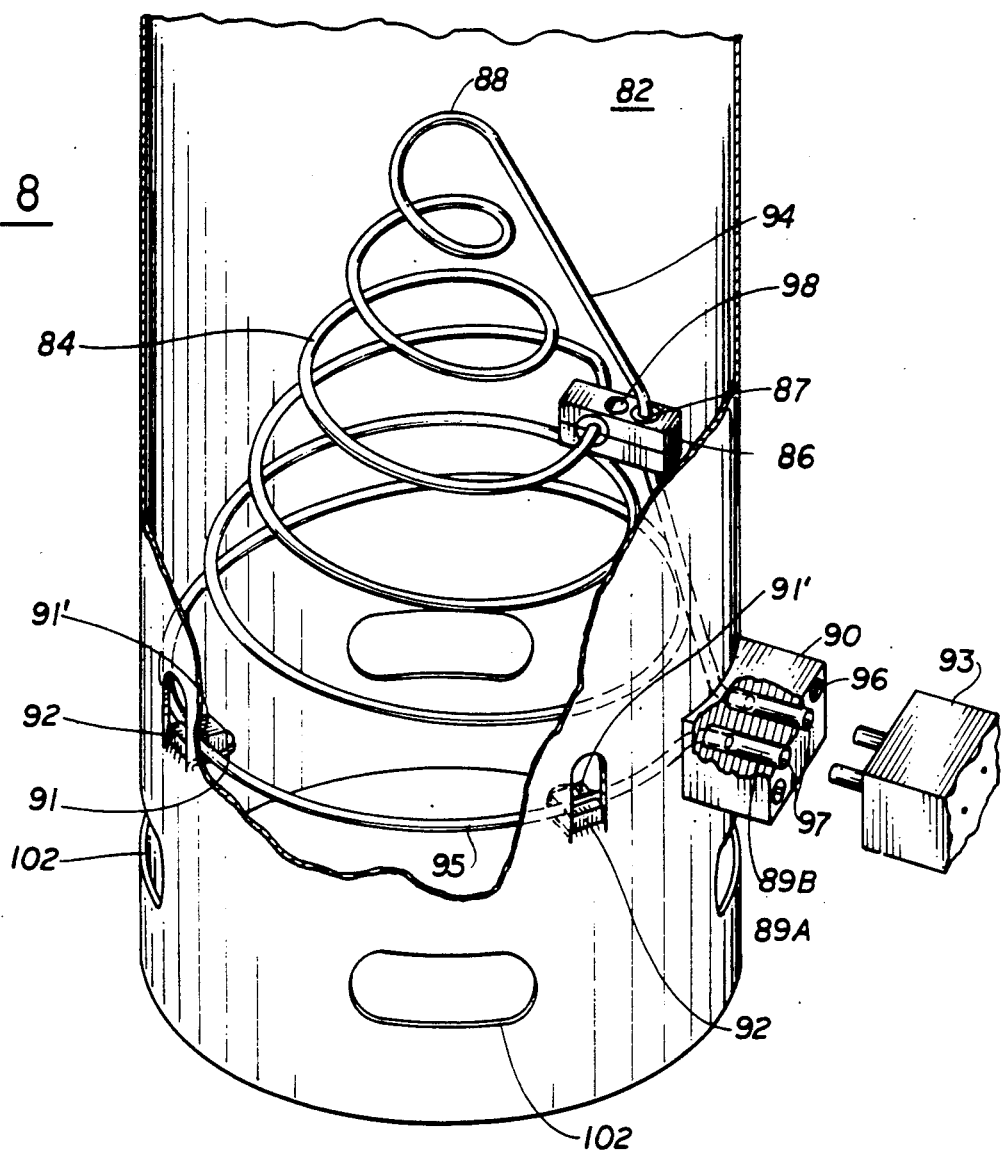
FIG. 8 is a perspective similar to FIG. 2 of the second embodiment of this invention.

The discussion now moves to the second embodiment of this invention, as seen in FIG. 8. In this embodiment, the cylinder 82 is shown partially cutaway for ease of drawing and understanding. The grate consists of a resistive, electrically insulated heating element typical of many found on electric cook tops and thus combines the best features of two types of charcoal starters. Here, a grate which is preferably comprised of a spiral wire conical portion 84 without a disk portion is employed. The upper end 88 of the spiral 84 is connected to a first long lead 94, while the second lead of this resistance type heater is provided by the lowest winding of the spiral 95. Each lead 94, 95 are electrically connected to one of the two electrical leads 89A, 89B. These leads are inserted into the rear end of the connector block 90, into suitable junction points which are usually conductive tubes, 97. The connector block itself 90 is attached to the cylinder wall 82 by conventional sheet metal screws or other suitable fasteners 96. The connector block is adapted to receive a line cord. Thus a standard two pin electrical plug 93 connected to a line cord and wall plug may be inserted into the conductive tubes 97 to bring current to the resistance heater wire forming the grate.

One or more two part optional insulators 86, may be employed to serve as spacers, and which insulators have bores 87 which may be attached to each of the spiral 84 and the long lead 94 to provide rigidity to the spiral. The two parts may be attached as is known to the art using an unseen nut or threaded hole on machine screw 98.

In order to prevent persons who touch the cylinder wall 82 from being shocked, the attachment mode employed is a variation of the mode of FIG. 6. Here, the tabs 91 enjoy an insulator, 92 having a snap recess or groove 91' into which the second lead 95 can fit to be gripped. The balance of lead 95 and the remainder of the spiral are spaced from the cylinder wall 82. Note, that the rest of the power cord is not seen in this view. Optionally, and for reduced manufacturing cost, a standard heating element from any of a number of manufacturers of electrical ranges or cook tops could be used. These elements are generally planar, electrically resistive and the actual conductive wire is electrically insulated. The preferred embodiment could be fabricated from one of these elements by stretching the coil.

The balance of the construction of this embodiment is similar to those discussed above. Thus the presence of an air intake, here noted as 102. Of course, an optional heat shield can be employed and mounted as is known to the art. Any handle including one of the nature discussed above may also be used.

Figure 9:
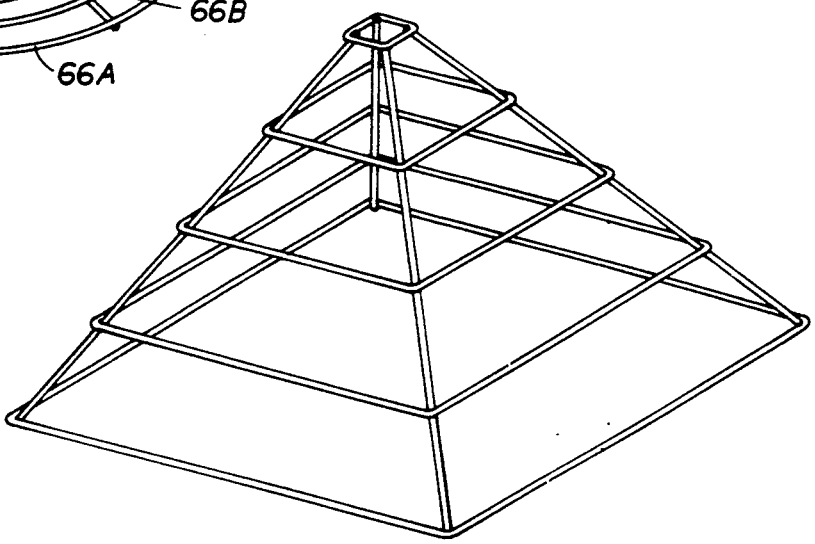
FIG. 9 is a perspective view of a variant in the configuration of an inverted cavity grate according to this invention.
Figure 10:
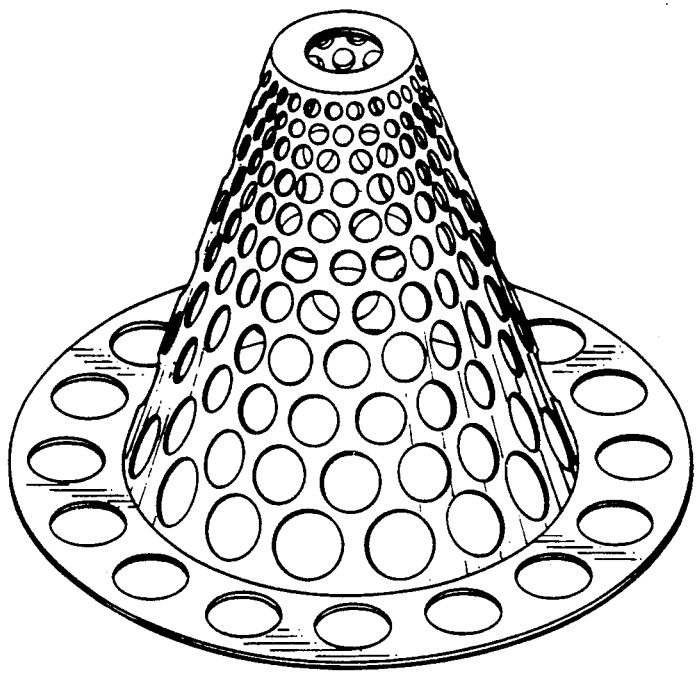
FIG. 10 is a perspective view of a 4th version of the device of this invention, wherein the product is formed by using a drawing die upon a substrate of stamped metal such as steel.

The discussion now moves to FIGS. 9 and 10 which demonstrate two additional variations on the design and construction materials with which a satisfactory grate can be made. FIG. 9 is an extension of the device of FIG. 7 where the general shape of the cavity is four sided pyramidal, and the structure is much the same as that of FIG. 7 using either a spiral of wire, or a series of concentric squares as shown with welded reinforcing legs in between the series of increasingly smaller squares. In FIG. 10, the grate is formed out of metal using a stamping die and is then drawn as is well known in the art. Another option not shown here would be a die formed expanded metal model. Any of these designs will outperform a planar grate.

The basic operation of all of the inverted cavity grates of this invention are basically the same. The reasoning has been pointed out from the benefits to be obtained herein. Thus reference should now be made by the reader to FIG. 11, and to FIG. 12.

Figure 11:
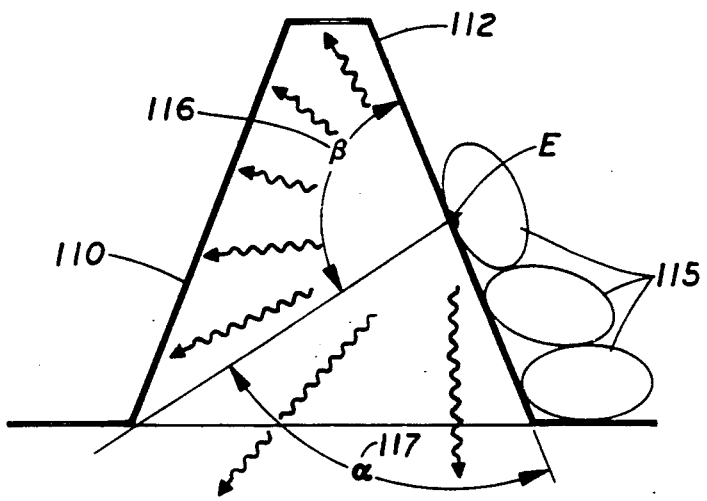
FIGS. 11 and 12 are diagrammatic representations showing radiation and boss angles from the position of embers on grates of this invention and the prior art said grates being shown in section.

In FIG. 11 the inverted conical grate seen in section is designated 110. Ember E which rests upon other coals 115 leans against the side wall 112 of the grate. The self-radiation angle as previously described is designated Beta and shown as 116 while the loss angle is designated Alpha and shown as 117.

Figure 12:
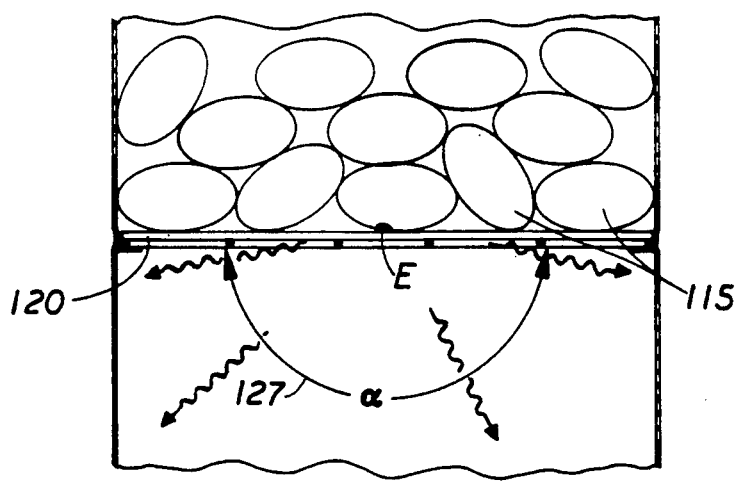

In FIG. 12 which depicts a flat grate 120 the ember E has a Beta angle of 0 degrees not shown and Alpha angle of 180 degrees, shown as 127 on flat grate 120.

Figure 13:
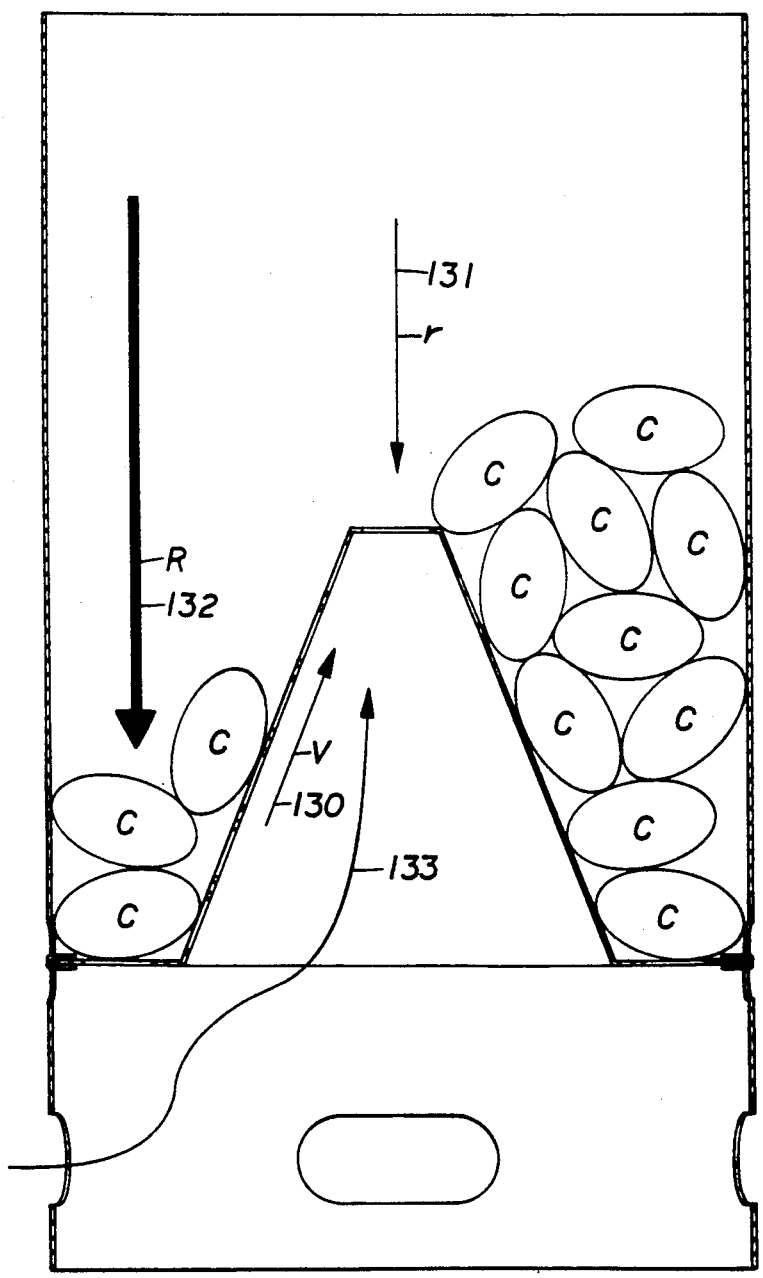
FIG. 13 is a diagrammatic sectional view of the grate of this invention and the resistance of fluid flow therethrough.

FIG. 13 illustrates the increased convection flow speed V, 130, due to the path of least resistance, 133 being taken which is up the interior of the inverted cone grate. Here "R", 132 and "r", 131 are shown as the forces of air flow resistance due to the presence of coals "C" on this sectionalized grate.

CONCLUSION

Several advantages are seen to evolve from my invention by creating an inverted cavity in the grate supporting the charcoal. Three physical phenomena act together to increase the speed at which a volume of charcoal can be brought about to burn.

First, the greater the surface area of charcoal exposed to the initial flames of the newspaper kindling during the initial heating, the faster the coals will be heated.

Second, the invention here employing the inverted cavity modifies the natural convection paths through a column of briquettes. The greater the distance the air must travel through a column of briquettes, the greater the resistance. Effectively, this invention creates a resistance gradient to the convective flow of gases across the width of the cylinder because the void within the cavity provides negligible resistance. A consequence of this resistance gradient is that a substantial portion of the heated, convecting gases flow vertically along the interior surface beneath the briquettes to the top of the cavity, preheating each successive coal up the interior surface of the cavity. More importantly, the cavity tends to focus a column of intense heat above the highest point of the cavity and in doing so, acts as a venturi, increasing the air velocity in the center of the charcoal receiver. The venturi effect is sustained and in fact increases throughout the entire heating of the briquettes. This blast of hot gases, following the path of least resistance, speeds the heating of coals vertically up the central core of the column of coals first, and then horizontally as the embers grow laterally to the perimeter of the cylinder.

Thirdly, each initial ember emits infrared radiation (or heat) to all surfaces it can "see" within its hemispherical field of view. In prior art, flat or planar grates, a typical ember E next to the supporting grate, "sees" in nearly its entire hemispherical field of view (or 180 degrees of loss in a cross sectional figure), the cold bottom, of the barbecue. This cold surface cools the ember by sinking its radiated energy. Put another way, the view factor of two briquettes on opposite sides of a horizontal grate is essentially zero percent, and therefore they cannot warm each other with their respective emitted energy.

In contrast, my improved grate with an inverted cavity causes the embers to see each other on opposing sides of the cavity. Without entering into a detailed calculation, approximately 70 degrees worth of energy is lost to the cold barbecue, while approximately 110 degrees is recaptured by briquettes on the opposite side of the cavity. The increased radiative view factor of the ember shown is therefore approximately 110 angular degrees, or 60 percent. This increased view factor of opposing briquettes using the instant invention promotes radiative self heating of the individual embers and greatly speeds the overall heating of the column of charcoal.

The combination of these three effects, using the preferred conical cavity design, results in a one third reduction in required lighting time in a typical chimney style charcoal starter. Whether the inverted cavity is formed by a spiral of wire, or a multi-perforated conical sheet metal hat, or some other configuration within the scope of this invention, so long as it permits the warm gases of the kindling paper to permeate through the stacked charcoal briquettes the same enumerated benefits will result.

Therefore, to be considered an inverted cavity in the context of this instant invention, the unit must contact at least two briquettes, and elevate them at least the height of one charcoal briquette above the approximate plane of a flat grate within the chimney charcoal starter. In other words, the unit must support the briquettes in such a way as to create a cavity beneath said briquettes which is substantially larger than the natural voids found in a pile of charcoal briquettes, and of course have apertures or slots small enough to prevent briquettes from falling through and large enough not to impede the flow of hot gases. The shape, conical, pyramidal, cylindrical, etc., of the walls of the cavity is substantially less important and it is obvious that these other shapes also offer advantages over a flat grate.

Since certain changes may be made in the above apparatus without departing from the scope of the invention herein involved, it is intended that all matter contained in the above description and shown in the accompanying drawings shall be interpreted as illustrative and not in a limiting sense.

I claim:

1. In a tubular chimney style charcoal starter having an elongated tubular housing with an interior and an exterior surface, the improvement comprising an air and hot gas permeable grate, wherein said grate has means for supporting charcoal briquettes in the shape of an inverted cavity constructed of a spiral coil of wire, and said spiral coil of wire consists of a first disk portion formed of a horizontal radially decreasing spiral, and a second conical extension which continues spiraling radially inward and as well, extends in the vertical direction.

2. The grate of claim 1 wherein said spiral coil of wire further includes reinforcement by a plurality of straight wires fixedly attached thereto.

3. A charcoal starter as in claim 1 wherein said spiral coil of wire consists of an electrically resistive coil of insulated wire, which is fixedly attached to, and electrically insulated from, said tubular chimney style charcoal starter.

4. An air and hot gas permeable inverted cavity creating, charcoal briquette supporting grate where said grate is open to the bottom, and is intended to be disposed within a tubular chimney style charcoal starter having both an interior and an exterior surface wherein said grate is constructed of a spiral coil of wire, and said spiral coil of wire consists of a first disk portion formed of a horizontal radially decreasing spiral, and a second conical extension which continues spiraling radially inward and as well, extends in the vertical direction.

5. The grate of claim 4 wherein said spiral coil of wire further includes reinforcement by a plurality of straight wires fixedly attached thereto.

6. The grate of claim 4, where said spiral coil of wire consists of an electrically resistive coil of insulated wire, which is fixedly attached to, and electrically insulated from, said tubular chimney style charcoal starter.

* * * * *